United States Patent Office 3,763,287
Patented Oct. 2, 1973

3,763,287
PHOSPHORUS CONTAINING DERIVATIVES
OF ω-(3,5-DIALKYL-4-HYDROXYPHENYL)
ALKANOLS
Max Eugene Chiddix, League City, Tex., and David James Tracy, Phillipsburg, N.J., assignors to GAF Corporation, New York, N.Y.
No Drawing. Filed Sept. 28, 1970, Ser. No. 76,313
Int. Cl. C07f 9/16; B01j 1/18
U.S. Cl. 260—941                    22 Claims

ABSTRACT OF THE DISCLOSURE

Phosphorus containing derivatives of ω-(3,5-dialkyl-4-hydroxyphenyl) alkanols, e.g. phosphites, phosphates, phosphonates, thiophosphates and thiophosphonates thereof, are described; together with methods for their preparation and their use as antioxidants. These products are represented by the following general formula:

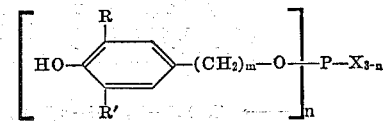

and

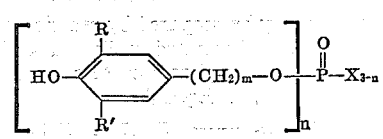

wherein

R and R′=alkyl of 1–18 carbons, arylalkyl of 7–18 carbons and cycloalkyl of 6–18 carbons
$m=1-4$, $n=1-3$, $Q=O$ or $S$ and
X=alkyl of 1–24 carbons, aryl of 6–18 carbon, arylalkyl of 7–18 carbons, cycloalkyl of 6–18 carbons, phenoxy, alkoxy, alkylphenoxy, thioalkyl, thiophenyl, haloalkyl or alkylcarboxyl of the formula:

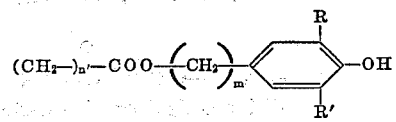

wherein $n'=1-4$ and R, R′ and m are as defined above.

---

This invention is directed to novel phosphorus containing compounds which are particularly useful as antioxidant agents for stabilization of organic compounds which tend to deteriorate in storage or in use due to oxidation or other such reactions. More particularly the instant invention is directed to phosphites, phosphates, phosphonates, thiophosphates and thiophosphonates derived from ω-(3,5-dialkyl-4-hydroxyphenyl) alkanols.

It is well known that many organic materials, such as lubricating oils, fuels, edible oils, elastomers, plastics, synthetic resins, etc. are adversely affected by oxygen giving rise to such undesirable results as formation of gum, discoloration, loss of physical properties such as tensile strength for resins or elasticity for elastomers, loss of potency, rancidity and/or odor formation and the like. The prevention of oxidative deterioration and the extension of the useful life of such materials by the use of numerous types of oxidation inhibitors, has been described in a number of patents and other technical literature. However, since by and large the various known antioxidants vary in their effectiveness, both between the antioxidants themselves and the compounds in which they are used and the conditions to which the stabilized compounds are subjected, there is a continuous search for novel compounds which are useful as antioxidants.

It is an object of the present invention to provide novel compounds which are useful as antioxidants in a wide variety of organic compounds, and which with many organic compounds show an antioxidant effect which is equal or superior to that of known antioxidants. It is a further object of this invention to provide novel antioxidants which are less expensive to manufacture than many known antioxidants. Other and further objects will become apparent as the present description progresses.

The novel antioxidant compounds of the present invention may be represented by the following general formula:

(A)

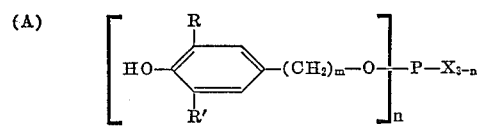

and (B)

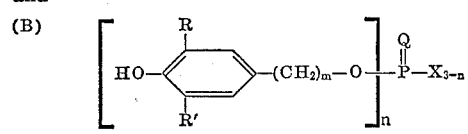

wherein

R and R′ represent an alkyl group of 1–18 carbon atoms, an arylalkyl group of 7–18 carbon atoms or a cycloalkyl group of 6–18 carbon atoms,
m represents an integer of from 1 to 4 inclusive,
n represents an integer of from 1 to 3 inclusive,
Q represents an oxygen or sulfur atom and
X represents an alkyl group of 1–24 carbon atoms, an aryl group of 6–18 carbon atoms, an arylalkyl group of 7–18 carbon atoms, a cycloalkyl group of 6–18 carbon atoms, or a phenoxy group, an alkoxy group having 1–18 alkyl carbon atoms, an alkylphenoxy group having 1–18 alkyl carbon atoms, a thioalkyl group (1–18 carbon atoms), thiophenyl group, a haloalkyl group (1–18 carbon atoms or an alkylcarboxyl group of the formula:

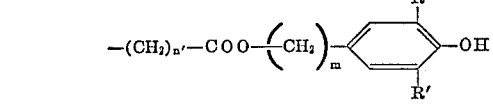

wherein $n'$ represents an integer of from 1–4 inclusive and R, R′ and m are as defined above.

From the foregoing general formula, it will be apparent that the novel compounds of the present invention may be considered as phosphorous containing esters of ω-(3,5 - dialkyl - 4 - hydroxyphenyl) alkanols. While numerous compounds containing hindered phenolic groups, e.g. a 3,5 - dialkyl - 4 - hydroxyphenyl group, have been disclosed as being useful as antioxidants, in most of the known phosphorous containing compounds which have a (3,5 - dialkyl - 4 - hydroxyphenyl) alkanyl group in their structure (such as the phosphonates disclosed in U.S. Pats. 3,006,945 to Goddard and Odenweller or 3,281,505 to Spivack) such groups are attached to the phosphorus through a carbon-phosphorus bond; aside from certain mono- and dialkyl-mono - 3,5 - dialkyl - 4 - hydroxybenzyl esters of phosphoric and thiophosphoric acid disclosed in U.S. Pat. 3,017,422 to Thompson, the phosphorus containing esters of 3,5 - dialkyl - 4 - hydroxybenzyl alcohol or other (3,5 - dialkyl - 4 - hydroxyphenyl) alkanols appear to have been previously unknown. We therefore believe that the phosphorus containing ester of ω-(3,5-dialkyl - 4 - hydroxyphenyl) alkanols of the present invention, which are represented by the foregoing general formula, represent a new class of compounds, which provide numerous additional compounds containing phosphorus and hindered phenolic groups useful as antioxidants.

The novel compounds of the present invention may be prepared from ω-(3,5 - dialkyl - 4 - hydroxyphenyl) alkanols of the formula (C) 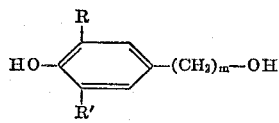

wherein R, R' and m are as defined above, by synthetic methods known in the art for producing phosphites, phosphates, phosphonates, thiophosphates and thiophosphonates of other alkanols. Certain preferred methods of synthesis are described in greater detail below.

The ω-(3,5 - dialkyl - 4 - hydroxyphenyl) alkanols, of the general formula given above, which are useful as intermediates for the production of our novel compounds include known 3,5 - dialkyl - 4 - hydroxy-benzyl alcohols, e.g., those described in U.S. Pat. 3,116,305 to Morris, Rocklin and Sax. As specific examples of suitable ω-(3,5-dialkyl-4-hydroxyphenyl) alkanols may be mentioned:

3,5-dimethyl-4-hydroxybenzyl alcohol
3-ethyl-5-methyl-4-hydroxybenzyl alcohol
3-isopropyl-5-methyl-4-hydroxybenzyl alcohol
3-tert.-butyl-5-ethyl-4-hydroxybenzyl alcohol
3-tert.-octyl-5-hexyl-4-hydroxybenzyl alcohol
3-cyclohexyl-5-octyl-4-hydroxybenzyl alcohol
3-tert.-butyl-5-isopropyl-4-hydroxybenzyl alcohol
3,5-diisopropyl-4-hydroxybenzyl alcohol
3,5-di-tert.-butyl-4-hydroxybenzyl alcohol
3,5-di-sec.-butyl-4-hydroxybenzyl alcohol
3,5-dicyclohexyl-4-hydroxybenzyl alcohol
3,5-di-tert.-amyl-4-hydroxybenzyl alcohol
3,5-di-sec.-octyl-4-hydroxybenzyl alcohol
3,5-di-tert.-octyl-4-hydroxybenzyl alcohol
3,5-dinonyl-4-hydroxybenzyl alcohol
3-tert.-butyl-5-dodecyl-4-hydroxybenzyl alcohol
3-tert.-butyl-5-octadecyl-4-hydroxybenzyl alcohol
3-tert.-butyl-5-bicyclohexyl-(2,2,1)-4-hydroxybenzyl alcohol
3-isopropyl-5-tolyl-4-hydroxybenzyl alcohol
3-tert.-butyl-5-ethylphenyl-4-hydroxybenzyl alcohol
3-methyl-5-hexylphenyl-4-hydroxybenzyl alcohol
3-tert.-butyl-5-(1,1,3,3-tetramethyl-n-butylphenyl)-4-hydroxybenzyl alcohol
3-methyl-5-octadecylphenyl-4-hydroxybenzyl alcohol Instead of the forgoing benzyl alcohols, higher alkanols having corresponding 3,5 - dialkyl-4-hydroxyphenyl substituents on their carbon atoms may be used. As examples thereof may be mentioned:

2-(3,5-dimethyl-4-hydroxyphenyl) ethanol
2-(3,5-di-tert.-butyl-4-hydroxyphenyl) ethanol
2-(3,5-dicyclohexyl-4-hydroxyphenyl) ethanol
2-(3-tert.-butyl-5-ethyl-4-hydroxyphenyl) ethanol
2-(3-isopropyl-5-ethylphenyl-4-hydroxyphenyl) ethanol
3-(3,5-di-tert.-butyl-4-hydroxyphenyl) propanol
3-(3-tert.-octyl-5-isopropyl-4-hydroxyphenyl) propanol
3-(3,5-di-tert.-octyl)-4-hydroxyphenyl) propanol
3-(3-methyl-5-hexylphenyl-4-hydroxyphenyl) propanol
3-(3-cyclohexyl-5-tert.-butyl-4-hydroxyphenyl) propanol
4-(3,5-di-tert.-butyl-4-hydroxyphenyl) butanol
4-(3-tert.-butyl-5-isopropyl-4-hydroxyphenyl) butanol
4-(3,5-di-sec.-octyl-4-hydroxyphenyl) butanol
4-(3-tert.-butyl-5-tert.-octyl-4-hydroxyphenyl) butanol While useful products are obtained by the use of ω-(3,5 - dialkyl - 4 - hydroxyphenyl) alkanols in which the alkyl groups in the 3 and 5 ring positions are either straight or branched chain; we particularly prefer to use those ω-(3,5 - dialkyl - 4 - hydroxyphenyl) alkanols in which at least one and more preferably both of such alkyl groups is branched on the alpha carbon atoms and especially prefer those in which such alkyl groups are tert.-butyl and/or tert.-octyl. In general it appears that those compounds in which the phenolic hydroxyl group is afforded the most steric hindrance by the adjacent branched alkyl groups have the best antioxidant properties.

The following are preferred methods for preparing the novel phosphites, phosphates, phosphonates, thiophosphates and thiophosphonates, of the present invention, of ω-(3,5 - dialkyl - 4 - hydroxyphenyl) alkanols such as those named above. In the equations illustrating these methods of synthesis the ω-(3,5 - dialkyl - 4 - hydroxyphenyl) alkanols such as those named above. In the equations illustrating these methods of synthesis the ω-(3,5 - dialkyl - 4 - hydroxyphenyl) alkanol is designated as "ZOH" and thus in these equations Z represents a ω-(3,5 - dialkyl - 4 - hydroxyphenyl) alkanyl radical, while X and n are as defined above.

The phosphites may be prepared by an ester interchange reaction with a trialkyl phosphite (preferably a tri-lower alkylphosphite), such as trimethylphosphite or triethylphosphite, or a triarylphosphite, such as triphenylphosphite or tricresylphosphite, as illustrated in Eq. I below, or by reaction with phosphorus trichloride, as illustrated in Eq. II:

Eq. I 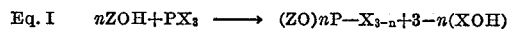

Eq. II 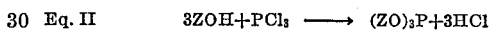

The phosphates may be prepared by reaction with phosphorus oxychloride, as illustrated in Eq. III, or by oxidation of the corresponding phosphite (e.g. with hydrogen peroxide) as illustrated in Eq. IV.

Eq. III 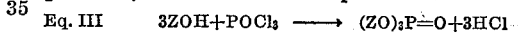

Eq. IV 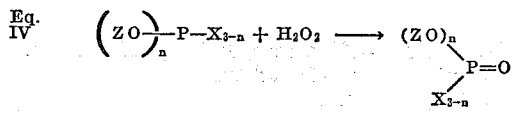

The phosphonates can be prepared by reaction with an alkyl or phenyl phosphonyl dichloride as illustrated in Eq. V, wherein R'' represents alkyl (including haloalkyl) of 1–24 carbons, aryl ($C_6$–$C_{18}$), arylalkyl ($C_7$–$C_{18}$) or cycloalkyl Eq. V 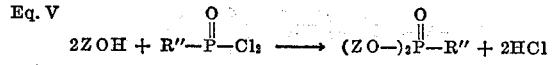

By reaction with dichloro-alkyl or phenyl-phosphines, such as dichloro-phenylphosphine, phosphinates may be prepared as illustrated in Eq. VI Eq. VI 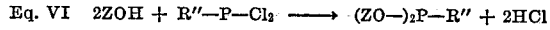

The thiophosphates may be prepared by reacting the phosphites (prepared as outlined in Eq. I or Eq. II above) by heating with sulfur as illustrated in Eq. VII Eq. VII 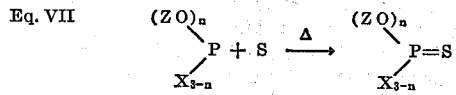

The thiophosphonates may be prepared by reaction with an alkyl- or phenyl-thiophosphonyl dichloride as illustrated in Eq. VIII Eq. VIII 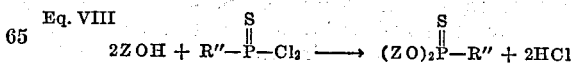

By selection of the specific reactants employed for the preparation of the novel products of this invention, it is apparent that the value of the several variables (R—, R'—, Q—, X—, m and n) in the general formula, A and B, thereof may also be selected and controlled.

As examples of alkyl groups which may be present as the substituents R and R' in 3 and 5 positions of the phenyl group of the ω-(3,5-dialkyl-4-hydroxyphenyl) alkanol of the Formula C employed for the production of our novel compounds, and which will thus constitute substituents R and R' of our novel products, may be mentioned: methyl, ethyl, n-propyl, butyl, isobutyl, t-butyl, amyl, t-amyl, hexyl, decyl, nonyl, n-dodecyl, branched dodecyl, 2-ethylhexyl, oxo-octyl, oxotridecyl, hexadecyl, octadecyl, behenyl, 1-methylcyclopentyl, cyclohexyl, dodecenyl, octadecenyl, oleyl, styryl, xylyl, tolyl, ethylphenyl, propylphenyl, hexylphenyl, octylphenyl, n-decylphenyl, isodecylphenyl, 1,1,3,3-tetramethyl-n-butylphenyl, dodecylphenyl, hexadecylphenyl, octadecylphenyl, dioctylphenyl, didodecylphenyl, bicyclohexyl-(2,2,1), bicycloheptyl-(2,2,2) and bicyclohexenyl-(2,2,1).

Products in which the substituent X is an alkyl group, such as one of the groups mentioned immediately above for R and R', may be prepared by starting with an alkylphosphonyl dichloride having the desired alkyl group. By selection of the specific phosphite phosphonyl or thiophosphonyl chloride, chloro-phosphine etc. used for their production X may also be: phenyl, alkylaryl-(such as cresyl, dibutylphenyl, nonylphenyl etc.) or phenoxy, thiophenoxy, ethylphenoxy, propylphenoxy, butylphenoxy, amylphenoxy, 1,1,3,3-tetramethyl-n-butylphenoxy, dodecylphenoxy, octadecylphenoxy, 1-chloroethyl, 1,2-dichloroethyl, 1,1,2-trichlorethyl, perchloroethyl, perfluoroethyl, —(CH$_2$)$_n$'COO—Z, ethoxy, butoxy, dodecyloxy, ethyl, octadecyl, etc.

The selection of specific reactants etc. to produce products having specific substituents is further exemplified in Table 1.

di-tert.-butyl-4-hydroxyphenyl)-propyl α - chloro-acetate and 33.2 g. (0.2 mole) of triethylphosphite, under nitrogen to 174° C. over a 4 hour period. During this period 10 g. of ethyl chloride was distilled off. A residue of 86.5 g. (98% of Theory) of a viscous oil was obtained whose infrared and nuclear magnetic resonance spectra agreed with the structure:

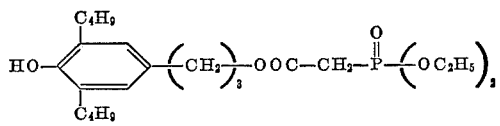

Elemental analysis was as follows:
Calculated for $C_{23}H_{39}PO_6$ (percent): C, 62.42; H, 8.88; MW=442. Found (percent): C, 62.21; H, 8.84; MW= 420.

EXAMPLE 3

The product of Example 2 was transesterified with 3-(3,5-di-tert.-butyl-4-hydroxyphenyl) propanol by mixing 22.1 g. (0.05 mole) of the product of Example 2 and 26.4 g. (0.1 mole) of 3-(3,5-di-tert.-butyl-4-hydroxyphenyl) propanol with 1.0 g. of sodium methoxide as catalyst. The reaction mixture was heated to 148° C. for 1 hour. Ethyl alcohol was distilled off. The reaction mixture was cooled, diluted with ether, washed with water, dried over sodium sulfate and concentrated yielding 42.6

TABLE 1

| | Product desired | | | | | May be prepared by reaction of— | | Phosphorus containing reactant |
|---|---|---|---|---|---|---|---|---|
| Formula | R | R' | X | m | n | Process | Alcohol | |
| a ... A | —CH$_3$ | —CH$_3$ | —O—⟨phenyl⟩ | 1 | 2 | Eq. I | 3,5-dimethyl-4-hydroxybenzyl alcohol (2 moles). | Triphenylphosphite. |
| b ... A | —t.C$_4$H$_9$ | —C$_4$H$_9$ | —OC$_2$H$_5$ | 1 | 1 | Eq. I | 3,5-di-t.butyl-4-hydroxybenzyl alcohol (1 mole). | Triethylphosphite. |
| c ... A | —t.C$_4$H$_9$ | —C$_4$H$_9$ | | 1 | 3 | Eq. II | 3,5-di-t.butyl-4-hydroxybenzyl alcohol (3 moles). | PCl$_3$. |
| d ... B(Q=O) | —i.C$_3$H$_7$ | —sec.C$_8$H$_{17}$ | | 3 | 3 | Eq. III | 3(3-isopropyl-5-sec.octyl-4-hydroxyphenyl) (3 moles). | POCl$_3$. |
| e ... B(Q=O) | —t.C$_4$H$_9$ | Cyclohexyl | —O—⟨phenyl⟩CH$_3$ | 3 | 1 | Eq. I and Eq. IV. | 3(3-t.butyl-5-cyclohexyl-4-hydroxyphenyl) (1 mole). | Tricresylphosphite. |
| f ... B(Q=S) | —t.C$_4$H$_9$ | —t.C$_4$H$_9$ | | 4 | 3 | Eq. II and Eq. VII. | 4(3,5-di-t.butyl-4-hydroxyphenyl) butanol-1 (3 moles). | PCl$_3$. |
| g ... B(Q=O) | —(CH$_2$)$_6$H | —t.C$_4$H$_9$ | —⟨phenyl⟩ | 3 | 2 | Eq. V | 3(3-hexylphenyl-5-t.butyl-4-hydroxyphenyl)-propanol-1 (2 moles). | Phenylphosphonyl-dichloride. |
| h ... A | —t.C$_4$H$_9$ | —t.C$_4$H$_9$ | —C$_2$H$_5$ | 3 | 2 | Eq. VI | 3(3,5-di-t.butyl-4-hydroxyphenyl) propanol-1 (2 moles). | Ethyl-dichloro-phosphine. |

The specific examples which follow illustrate, in detail, various preferred methods for the synthesis of certain of the preferred novel compounds of the present invention.

EXAMPLE 1

Di-3-(3,5-di-tert.-butyl-4-hydroxyphenyl)-propyl phenyl phosphonate was prepared by mixing in a reaction flask 3.8 g. (0.04 mole) of phenylphosphonyl dichloride and 10.4 g. (0.04 mole) of 3-(3,5-di-tert.-butyl-4-hydroxyphenyl)propanol. The reaction mixture was heated under nitrogen to 130° C. for 5 hours. The reaction mixture was cooled, diluted with ether, washed with water, dried over sodium sulfate and concentrated yielding 10.9 g. (84% of Theory) of an oil. The infrared and nuclear magnetic resonance spectra of this oil were consistent with the named structure. Elemental analysis of the oil was as follows:

Calculated for $C_{40}H_{59}O_5P$ (percent): C, 73.81; H, 9.14; P, 4.76. Found (percent): C, 73.80; H, 9.08; P, 4.64.

EXAMPLE 2

The compound corresponding to the structure below was prepared by heating: 68.0 g. (0.2 mole) of 3-(3,5- g., as a viscous oil. The product possessed the following structure:

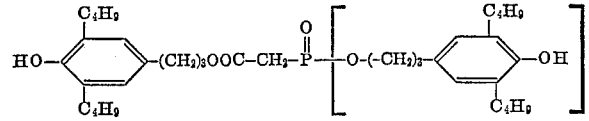

*Elemental analysis.*—Calcd. for $C_{53}H_{83}O_8P$ (percent): C, 72.40; H, 9.52; P, 3.52. Found (percent): C, 69.59; H, 9.91; P, 3.01.

EXAMPLE 4

The product of the formula:

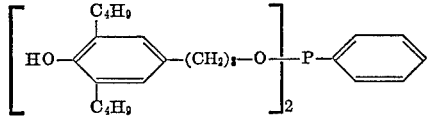

was prepared by mixing 3.6 g. (0.02 mole) of phenyl dichlorophosphine and 10.4 g. (0.04 mole) of 3-(3,5-di-tert.-butyl-4-hydroxyphenyl) propanol. The reaction mixture was heated under nitrogen to 148–153° C. for 6 hours. It was cooled, diluted with ether, washed with water, dried over sodium sulfate and concentrated to yield 10 g. of the above product as a yellow oil.

*Elemental analysis.*—Calcd. for $C_{40}H_{59}PO_4$ (percent): H, 9.37; 4.88. Found (percent): H, 9.44; 3.77.

EXAMPLE 5

Tris - 3 - (3,5-di-tert.-butyl-4-hydroxyphenyl)-propyl phosphate was prepared by adding to a solution of: 150 ml. benzene, 47.5 g. (0.18 mole) of 3-(3,5-di-tert.-butyl-4-hydroxyphenyl) propanol and 14.2 g. of pyridine and at 3° C. over a 50 minute period 9.2 g. (0.06 mole) phosphorus oxychloride. The reaction mixture was then allowed to warm to room temperature, heated to reflux and refluxed for 4.5 hours. It was cooled, washed with water, dried over sodium sulfate and concentrated yielding 46.6 g. (91% of Theory), of the titled compound as a viscous yellow oil.

*Analysis.*—Calcd. for $C_{51}H_{81}PO_7$ (percent): C, 73.12; H, 9.75; P, 3.69. Found (percent): C, 72.84; H, 9.75; P, 3.68.

EXAMPLE 6

Di - 3 - (3,5-di-tert.-butyl-4-hydroxyphenyl)-propyl-β-chloro-ethyl-phosphonate was prepared as follows: A solution of 200 ml. benzene, 26.4 g. (0.1 mole) 3-(3,5-di-tert.-butyl-4-hydroxyphenyl)-propanol and 9.8 g. (0.05 mole) dichloro-β-chloroethyl phosphonate was cooled under nitrogen to 10° C. To the solution was added slowly 7.9 g. (0.1 mole) of pyridine. The mixture was allowed to warm to room temperature over a 2 hour period and then refluxed for 0.5 hour. Pyridine hydrochloride was filtered off and the filtrate was washed with water and concentrated yielding 27.2 g. (85% of Theory) of the named compound as a light yellow oil.

*Analysis.*—Calcd. for $C_{36}H_{58}PO_5Cl$ (percent): C, 64.85; H, 9.17; P, 4.86; MW=637. Found (percent): C, 64.62; H, 9.00; P, 4.95; MW=601.

EXAMPLE 7

To 100 ml. of benzene, was added 5.2 g. (0.02 mole) of 3-(3,5-di-tert.-butyl-4-hydroxyphenyl) propanol and 2.1 g. (0.01 mole) of phenylthiophosphonyl dichloride. To this solution was added at 25° C. 7.9 g. (0.1 mole) of pyridine. The reaction mixture was refluxed 5 hours and then was filtered, washed with water, dried and concentrated yielding 5.9 g. (90% of Theory) of a semi-solid product of the formula:

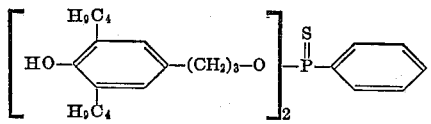

*Analysis.*—Calcd. for $C_{40}H_{59}PO_4S$ (percent): H, 8.92; S, 4.81; P, 4.65. Found (percent): H, 8.72; S, 4.61; P, 3.86.

EXAMPLE 8

Tris - 3 - (3,5-di-tert.-butyl-4-hydroxyphenyl)-propyl phosphite was prepared by slowly heating to 130° C. at 12 mm. of Hg pressure 21.0 g. (0.08 mole) of 3-(3,5-di-tert.-butyl-4-hydroxyphenyl) propanol. To this there was added slowly 8.3 g. (0.027 mole) of triphenylphosphite. The reaction mixture was heated to 180–190° C. at 12 mm. of Hg. After 2 hours the pressure was lowered to 4 mm. to distill off the remaining phenol. A colorless oil weighing 23.2 g., the named product, was obtained.

EXAMPLE 9

Tris-(3,5-di-tert.-butyl-4-hydroxybenzyl) phosphite was prepared according to the method of Example 8 employing: 70.8 g. (0.3 mole) of 3,5-di-tert.-butyl-4-hydroxybenzyl alcohol and 31.0 g. (0.3 mole) of triphenylphosphite. The desired product was obtained as an orange oil in a yield of 55.7 g. (76% of theory).

*Analysis.*—Calcd. for $C_{45}H_{69}O_6P$ (percent): C, 73.30; H, 9.43; P, 4.20; NM=736. Found (percent): C, 73.70; H, 8.28; P, 3.25; MW=650.

The novel compounds of this invention find utility as antioxidants in a wide variety of organic materials susceptible to oxidative and related degradation. For example the instant compounds show excellent antioxidant activity in synthetic resins, plastics, elastomers, edible oils, lubricating oils and fuels.

Among the examples of plastics that may be protected by the novel antioxidant compounds of this invention against oxidative degradation are included such polyolefines such as poly(ethylene), poly-(propylene), poly(butene - 1), poly(pentene - 1), poly(3 - methylbutene-1), poly(4 - methylhexene - 1), poly(4,4-di-methylpentene-1), and copolymers of these olefin monomers such as poly (ethylene copropylene) and polymers of other polymerizable liquid ethylenically unsaturated monomers and the like.

Other plastics and resins which may be protected against oxidation include poly(styrene), poly(methyl styrene), poly(acrylates), poly(methyl acrylates), poly(ethyl acrylates), poly(2-ethylhexylacrylate), polycarbonates, polyesters such as polyethylene terephthalate, polyphenylene oxide, polysulfones, polyimides, polybenzimidazoles, poly-(acrylonitrile), poly(vinylchloride), poly(vinylacetate), poly(ethylene oxide), poly(propylene oxide), poly(methyl vinyl ether), poly(butyl vinyl ether), ketone-formaldehyde resins, indene resins and the like.

Synthetic lubricants which can be protected include alkyl oxalates, malonates, succinates, glutarates, adipates, pimelates, suberates, azelates, sebacates, esters from polyols such as pentaerythritol, trimethylol propane and sorbitol, alkyl esters of aliphatic monocarboxylic acids such as lauric, oleic, palmitic, stearic and behenic acids and the like. Other lubricants include silicone lubricants such as polysiloxane oils and greases of the type poly-alkyl, polyaryl, polyalkoxy, polyaryloxy such as polydimethoxyphenoxy siloxane, silicate ester oils such as tetraalkyloxy and tetraaryloxysilanes, and the like. Also fluocarbon lubricants such as $(-CF_2CFCl-)_n$ where $n$=an integer, and polyalkylene glycol lubricants such as ethylene oxide-propylene oxide copolymers.

Phosphate ester lubricants such as

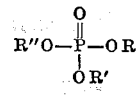

wherein R, R' and R" represent hydrogen, phenyl, alkylphenyl or an alkyl radical such as butyl, octyl, lauryl, oleyl, palmityl and the like.

Examples of elastomers which may be protected against oxidation include natural rubber, SBR rubber, GR-S rubber, GR-N rubber, polybutadiene, cis-1,4-polyisoprene, neoprene rubber, butyl rubber, nitrile rubber and chloroprene and the like.

Hydraulic fluids and lubricants, industrial oils, automatic transmission fluids, (or simply) transmission fluids, crankcase lubricating oils, transformer oils, turbine oils, cutting oils, gear oils, white oils, glass annealing oils, hydrocarbon waxes, and the like may also be protected. Other lubricants include synthetic base greases formed by mixing a soap with an oil, soaps derived from animal and vegetable fats and oils, fatty acids, wool grease, rosin or petroleum acids, e.g., lead oleate, lithium stearate and the like.

Fuels which may be protected by the compounds of this invention include gasoline, jet fuel, diesel fuel, kerosine, and fuel oil and the like.

In addition to the above; commercial and edible fats and oils may be protected such as menhaden oil, cod liver oil, safflower oil, castor oil, olive oil, sesame oil, peanut oil, babassu oil, palm oil, corn oil, oleomargarine, lard, butter, beef tallow, animal fat and hydrogenated shortening products such as Spry, Crisco and Snowdrift. However, adequate safe-guards and tests should first be carried out to be absolutely sure that the resultant compositions are not detrimental to humans or animals.

The novel compounds of the present invention may be added to the organic material which is to be protected, in any manner. Simple intimate mixing or milling is frequently satisfactory. At other times the compounds of the present invention may be diluted with any mutual solvent for the organic material to be protected and then added. The novel compounds of this invention are usually used in an amount of from about 0.01 to 5 parts by weight of such compound, per 100 parts by weight of the organic material.

The effectiveness of the novel compounds of this invention as antioxidants is illustrated by the following specific examples of their use.

EXAMPLE 10

To illustrate the effectiveness of the compounds of this invention as antioxidants in protecting polypropylene, the standard oven oxidation test was used.

The antioxidant compound under test is compounded into unstabilized polypropylene on a Banbury type laboratory mill (Brabender Plastograph) at 183° C. for 10 minutes. A 40 mil thick sheet of compounded material is compression molded on a laboratory press (Carver) using 245° C. platen temperatures, 10,000 lbs. pressure on the 2¼ in. diameter ram, and a dwell time of 2 minutes. The sheets are air cooled under pressure before removal from the press. Standard micro-dumbell specimens (ASTM D 1708–59T) are die cut from the sheet. The specimens are suspended vertically in an air circulating oven operating at 300° F. Time to failure is noted as the exposure time required to produce breaking of the specimen when flicked with the finger.

The results obtained in this test, when using the products of the foregoing Examples 1–9 at a concentration of 0.5 part thereof per 100 parts of polypropylene, are summarized in Table 2:

TABLE 2

| Additive | Conc. (phr.) | Hours to failure |
|---|---|---|
| Product of— | | |
| Example 1 | 0.5 | 1,140 |
| Example 2 | 0.5 | 31 |
| Example 3 | 0.5 | 416 |
| Example 4 | 0.5 | 101 |
| Example 5 | 0.5 | 950 |
| Example 6 | 0.5 | 732 |
| Example 7 | 0.5 | 602 |
| Example 8 | 0.5 | 904 |
| Example 9 | 0.5 | 411 |
| None | | 7 |

EXAMPLE 11

The great value of this invention in providing increased antioxidant protection for lubrication oils is illustrated by the results obtained in the Rotary Bomb Oxidation Test (ASTM D 2272–64T).

In this test 50 g. of test oil, 5 ml. of distilled water and 10 ft. of No. 14 AWG electrolytic copper wire wound in a coil with an outside dia. of 50 to 52 mm. are placed in a glass container. The glass container is then inserted in a chrome plated copper bomb and covered with a watch glass. Five ml. of distilled water is also added to the bomb to aid heat transfer when the bomb is placed in the heating bath. The bomb is then closed and sealed. A pressure gage is attached. The bomb is charged with oxygen to 90 p.s.i. and allowed to stand for 10 minutes to check for any leaks. The bomb is then placed on rotating stand in a heating bath, kept at 150° C. The bomb is titled to 30° from the horizontal and rotated at 100 r.p.m. Within 10 15 minutes the contents of the bomb attain the temperature of the bath and the pressure in the bomb increases from 90 p.s.i. to about 180 to 190 p.s.i. due to expansion of $O_2$. The pressure of the bomb remains at this level for a certain time, the length of the time depending on the effectiveness of the oxidation inhibitor in the test oil formulation, and then starts to drop. The period from the time when the maximum pressure is attained to the time when the pressure has dropped by 25 p.s.i. from the maximum pressure, is reported as induction period and serves as a measure for the effectiveness of the oxidation inhibitor.

The oil used for this test in this and the remaining examples was a solvent refined paraffinic oil having the following properties:

| | | |
|---|---|---|
| Gravity | ° API | 32.2 |
| Kinematic visc. est.: | | |
| 100° F. | | 103 |
| 210° F. | | 39.5 |
| VI | | 95 |
| Pour pt. | ° F. | 10 |
| Flash pt. | ° F. | 380 |
| Color ASTM | | 0.5 |
| Fire | ° F. | 430 |
| Neutralization value | | Nil |
| Cu corrosion 212° F. | | Neg. |

Results are summarized in Table II.

TABLE II

| Additive | Conc. (percent) | Induction time (min.) |
|---|---|---|
| Product of— | | |
| Example 1 | 0.5 | 70 |
| Example 2 | 0.5 | 63 |
| Example 4 | 0.5 | 77 |
| Example 5 | 0.5 | 65 |
| Example 6 | 0.5 | 50 |
| Example 7 | 0.5 | 120 |
| Example 8 | 0.5 | 173 |
| None | | 26 |

The lifetime of the oil is increased by as much as a factor of seven.

EXAMPLE 12

In order to demonstrate the increased protection against oxidation provided by our novel compounds for liquid fuels such as catalytically cracked gasoline, the standard ASTM D–525–55 test was used.

50 cc. of test gasoline in a glass container is put into a stainless steel bomb and charged with $O_2$ to attain the pressure of 100 p.s.i. A pressure gauge is attached to the bomb. The whole assembly is placed into boiling water.

Break point for the experiment is reached when a pressure drop of 2 p.s.i. is observed in 15 min. and in subsequent 15 min. a pressure drop of more than 2 p.s.i. This time is taken as the induction period.

Physical data of the gasoline used

| | Catalytic gas |
|---|---|
| API, gravity, ° F. | 49.7 |
| Distillation, initial BP (° F.) | 108 |
| 5% (° F.) | 134 |
| 10% (° F.) | 148 |
| 20% (° F.) | 168 |
| 30% (° F.) | 192 |
| 40% (° F.) | 224 |
| 50% (° F.) | 258 |
| 60% (° F.) | 292 |
| 70% (° F.) | 324 |
| 80% (° F.) | 358 |
| 90% (° F.) | 396 |
| 95% (° F.) | 416 |
| End point | 432 |
| Recovery, percent | 98 |
| Reid Vapor Pressure/100° F., lbs. | 5.1 |

Oxidation stability afforded the above catalytically cracked gasoline is demonstrated by the data summarized in Table 4.

TABLE 4

| Additive | Conc. (percent) | Induction time (min.) |
|---|---|---|
| Product of— | | |
| Example 2 | 0.05 | 520 |
| Example 5 | 0.05 | 835 |
| None | | 315 |

The products of this invention increased dramatically the lifetime of gasoline.

We claim:

1. A compound having the formula:

(A) 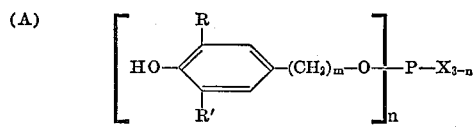

or (B) 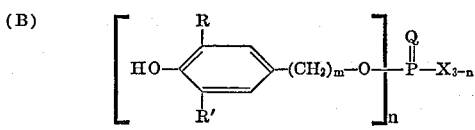

wherein

R and R' represent an alkyl group of 1-18 carbon atoms, an arylalkyl group of 7-18 carbon atoms or a cycloalkyl group of 6-18 carbon atoms, $m$ represents an integer of from 1 to 4 inclusive, $n$ represents an integer of from 2 to 3, Q represents an oxygen or sulfur atom and X represents an alkyl group of 1-24 carbon atoms, an aryl group of 6-18 carbon atoms, an arylalkyl group of 7-18 carbon atoms, a cycloalkyl group of 6-18 carbon atoms, or a phenoxy group, an alkoxy group having 1-18 alkyl carbon atoms, an alkylphenoxy group having 1-18 alkyl carbon atoms, thioalkyl group (1-18 carbon atoms), thiophenyl group, a haloalkyl group (1-18 carbon atoms) or an alkylcarboyxl group of the formula:

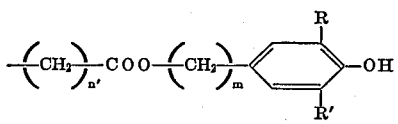

wherein $n'$ represents an integer of from 1-4 inclusive and R, R' and $m$ are as defined above.

2. A compound having Formula A specified in claim 1 and wherein $n$ is 3.

3. A compound as defined in claim 2 and wherein R and R' are tertiary butyl.

4. A compound as defined in claim 3 and wherein $m$ is 3.

5. A compound as defined in claim 3 and wherein $m$ is 1.

6. A compound having Formula B specified in claim 1 and wherein $n$ is 3.

7. A compound as defined in claim 6 and wherein R and R' are tertiary butyl.

8. A compound as defined in claim 7 and wherein Q is oxygen and $m$ is 3.

9. A compound having Formula B specified in claim 1 and wherein X is phenyl and $n$ is 2.

10. A compound as defined in claim 9 and wherein R and R' are tertiary butyl.

11. A compound as defined in claim 10 and wherein Q is oxygen and $m$ is 3.

12. A compound as defined in claim 10 and wherein Q is sulfur and $m$ is 3.

13. A compound having Formula B specified in claim 1 and wherein X is alkyl or haloalkyl, and $n$ is 2.

14. A compound as defined in claim 13 and wherein R and R' are tertiary butyl.

15. A compound as defined in claim 14 and wherein X is β-chloroethyl and $m$ is 3.

16. A compound having Formula A specified in claim 1 and wherein X is phenyl and $n$ is 2.

17. A compound as defined in claim 16 and wherein R and R' are tertiary butyl.

18. A compound as defined in claim 17 and wherein $m$ is 3.

19. A compound having Formula A specified in claim 1 and wherein $n$ is 2 and X is:

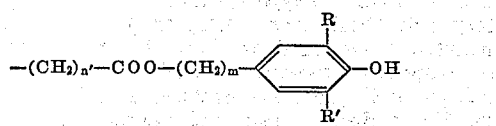

20. A compound as defined in claim 19 and wherein R and R' are tertiary butyl.

21. A compound of the formula:

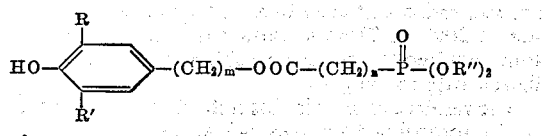

wherein

R and R' represent an alkyl group of 1-18 carbon atoms, an arylalkyl group of 7-18 carbon atoms or a cycloalkyl group of 6-18 carbon atoms, R'' represents methyl, ethyl, phenyl or cresyl, and $m$ and $n'$ each represent an integer of from 1-4 inclusive.

22. A compound as defined in claim 21 wherein R and R' are tertiary butyl.

References Cited

UNITED STATES PATENTS

| | | | |
|---|---|---|---|
| 3,061,586 | 10/1962 | Thompson | 260—953 X |
| 3,361,846 | 1/1968 | Gleim et al. | 260—953 X |
| 3,467,735 | 9/1969 | Hunter | 260—953 |
| 3,639,538 | 2/1972 | Kleiner | 260—941 |

ANTON H. SUTTO, Primary Examiner

U.S. Cl. X.R.

44—76, DIG. 4; 252—46.6, 49.8, 400; 260—398.5, 619 R, 953, 976